Patented July 19, 1949

2,476,890

UNITED STATES PATENT OFFICE 2,476,890

COMPOSITION FOR CONTROL OF POULTRY COCCIDIOSIS

Neal F. Morehouse, Charles City, Iowa, assignor to Dr. Salsbury's Laboratories, a corporation of Iowa No Drawing. Application September 30, 1947, Serial No. 777,107

12 Claims. (Cl. 167—53.1)

This invention pertains to the art of veterinary medicine, and more particularly it is concerned with the therapeutic treatment of coccidiosis applicable to the avian species. In its primary adaptation, the invention is directed to the prophylaxis and control of coccidiosis in poultry.

The cause of poultry coccidiosis is attributable to various species of protozoa such as: *Eimeria mitis, Eimeria praecox, Eimeria acervulina, Eimeria maxima, Eimeria necatrix, Eimeria hagani, Eimeria brunetti* and *Eimeria tenella*; in turkeys, the known species are *Eimeria meleagridis* and *Eimeria meleagrimitis* while other kinds of poultry are affected by specific protozoa of the genus Eimeria. These organisms multiply in the digestive tract, particularly in the lining of the intestines, producing a severe inflammation of the tissues. Birds afflicted with the disease may, depending upon the extent of injection, manifest various symptoms, such as mild to severe bowel disorders, emaciation, hemorrhage and anemia, with a substantial proportion of resulting fatalities.

Illustrative of a prevalent form of poultry coccidiosis, especially applicable to chickens, is that commonly referred to as the cecal or bloody type, caused by the coccidium *E. tenella*. This affliction is usually characterized by severe hemorrhage at about the fifth day after infection, and induces a general unthriftiness of the bird. Chickens seemingly most susceptible are within the age range of two to twelve weeks, but older birds sometimes suffer from this disease. Cecal coccidiosis results in a high mortality rate in poultry flocks, with an attendant economic loss of serious magnitude.

Considerable study has been directed to determining effective treatment, prevention and control of coccidiosis in poultry. Efforts have been made to avoid infection by resort to devious hygienic practices, but at best the course involved has related to the expedient of reducing transmission of the disease without affording an adequate control over the disease. Various substances have been proposed as of therapeutic value for coccidiosis, but these have been of comparatively limited value, as evidenced by the persistency of the coccidiosis menace to the poultry industry.

It is an object of the present invention to provide a novel and effective therapeutic treatment for coccidiosis in poultry.

It is another object to determine the conditions of efficacy of a pharmaclogically active substance which functions by oral ingestion to control coccidiosis in poultry without involving any physiological hazard to the birds.

An additional object is to obtain an orally ingestible therapeutic substance which will manifest prophylactic characteristics relative to poultry coccidiosis and which is adapted for oral ingestion.

An important advantage of the invention is that the therapeutic substance administered in the manner described does not adversely affect normal food and water consumption.

Other objects, advantages, and features of the invention will become apparent from the following description of the features of the invention, it being understood that this description is not limitative as to the scope of the invention.

Within the purview of the present invention it has been ascertained that various halogenated organic arsenical compounds are therapeutically effective with respect to coccidiosis in poultry, despite the generally recognized toxicity of these compounds both to man and animals. These primarily toxic arsonate compounds manifest a distinct pharmacological activity in the prevention and control of the disease when orally ingested under appropriate conditions of concentration, without manifesting any undue physiological effect on the bird or unfavorable reaction on its food and water consumption.

Of material significance is the high pharmacological potency displayed by halogenated arsonic compounds of the present invention relative to the control or alleviation of poultry coccidiosis. This property permits expedient medication in the therapeutic control of coccidiosis, with comparably lower dosages or concentrations than required by other substances used for the same purpose.

The preferred compounds according to my invention, adapted to manifest significant anticoccidial properties, are best illustrated by the following structural formula:

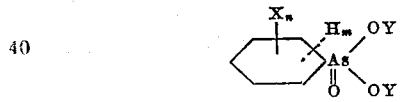

wherein X designates a halogen substituent in any of the positions ortho, meta and para, relative to the arsonate group and the compound may be any one of the mono-, di-, and trihalogenated types.

Y designates a substance from the group consisting of hydrogen, ammonium and a relatively non-toxic metal forming a soluble salt with said compound; and where $n$ and $m$ are integers, $n$ being from 1 to 3, the sum of $n$ and $m$ being 5.

Thus the anticoccidial compounds herein include halogenated arsonic compounds wherein the ring nucleus may be substituted by any halogen, including chlorine, bromine, fluorine and iodine, in any one or all of the available positions ortho, meta and para relative to the As.

While there is no intent to be restricted to any particular theory or explanation, there are indications to the effect that the present invention is predicated, for its physiological manifestations, at least in substantial measure, on the anionic portion of the halogenated phenylarsonates utilized.

Thus the invention contemplates within its scope any halogenated phenylarsonate compounds which may provide the anion under any conditions suitable for or applicable to oral ingestion. Desirably the compounds may be such as are ionizable in water. However any other vehicle or medium may be relied upon to attain the said ionization, provided the vehicle or medium is adapted for oral ingestion.

Preferred embodiments of the invention comprise the halogenated phenylarsonic acids and salts thereof. Fundamentally any salt may be utilized which, in the concentrations administered pursuant to the invention, is either non-toxic or not excessively toxic. Desirable salts comprise those of the alkaline earth metals, iron, magnesium, cobalt and their equivalents, the preferred adaptations being the mono- and dibasic types. It will however be understood that the salts designated are primarily illustrative and are not intended to be restrictive of the scope of the invention. Compounds representative of the optimum embodiment are those which manifest solubility in water or in aqueous solutions adapted for oral ingestion, and especially the halogenated phenylarsonic acids as well as the alkali metal and ammonium salts.

The critical aspects of the invention are predicated on the concept that despite the inherent toxicity of the halogenated phenylarsonic acid compounds, they may be administered by oral ingestion in concentrations which are essentially non-toxic or not excessively toxic, and under these conditions of concentration will manifest a therapeutic effect on poultry coccidiosis, especially with respect to the prevention and control of the disease. Fundamentally the concentration may be anything found effective below a critical upper limit; concentrations in excess thereof resulting in undue toxicity and possible fatality to the poultry. While certain numerical concentration ranges represent optimum conditions for given substances, it should be understood that the concentration range is subject to variation dependent upon various factors illustratively referred to hereinbelow. Nevertheless an appropriate concentration within the critical range designated will be readily determinable by one skilled in the art on the basis of the applicable conditions in view of the concept and teaching of the present invention.

As indicated above, despite the critical significance of the appropriate concentration ranges effective in coccidiosis, a certain latitude of variation is to be afforded in view of the variable conditions of administration that may be encountered. For instance, the environment, the breed of the poultry and the individual characteristics of the birds subject to treatment, such as their age, weight, disposition, et cetera, may have a bearing upon the concentration range. Similarly the vehicle may affect the values of dosage concentration, and this is exemplified by a comparison between the concentration ranges applicable to aqueous solutions and those to poultry feed, as shown in tabulation A hereinbelow.

The concentration values referred to herein are expressed on the basis of the composition which is actually utilized. Primarily the indicated values comprise the proportionate content of the halogenated phenylarsonate compound in the composition which is administered. The composition may expediently comprise a non-toxic vehicle or medium for the medicament together with the halogenated phenylarsonate compound. The vehicle or medium may be any orally ingestible non-toxic substance which is used as a carrier and manifesting no undue physiological effect on the poultry or on the effectiveness of the phenylarsonic acid compound utilized. The vehicle may serve as the medium in which the ionization of the arsonic compound takes place, or as previously stated, the ionization may be effected by the digestive fluids of the poultry. Desirably the vehicle may be any substance in the category of poultry feed including within its scope solid or liquid feed, drinking water, and mash. Similarly the vehicle may comprise any solid or liquid medicinal excipient. Illustrative vehicles distinguishable from the category of poultry feed are ingestible oils, non-toxic alcohols of suitably dilute concentration, and solid substances which may or may not have some independent physiological effect, illustrated by phenolsulfonates, boric acid, dextrose, et cetera. It will be understood that the composition may likewise comprise substances, such as the vehicle and/or other perfecting ingredients which serve to enhance the pharmacological activity thereof in any predetermined manner.

The following tabulation is illustrative of optimum embodiments of the halogenated phenylarsonate compounds of the invention and their respective optional concentration ranges in both drinking water and in poultry feed, which are the preferred vehicles. As previously indicated the preferred compounds are those which are water soluble including primarily the acid species and the salts thereof, especially the alkali metal and ammonium salts, and the concentrations indicated pertain to the preferred adaptation of the invention which is that of cecal or bloody coccidiosis attributable to *Eimeria tenella*.

TABLE A

*Effective optimum concentration range of halogenated phenylarsonic acids and their salts*

| Compound | Effective, Tolerated Conc. Range in Water, Per Cent | Effective, Tolerated Conc. Range in Feed, Per Cent |
| --- | --- | --- |
| 2-Chloro-phenylarsonic acid | 0.001981–0.007926 | 0.003962–0.015852 |
| 3-Chloro-phenylarsonic acid | 0.002642–0.010568 | 0.005284–0.021136 |
| 4-Chloro-phenylarsonic acid | 0.005284–0.013210 | 0.005511–0.022045 |
| 3-5-Dichloro-phenylarsonic acid | 0.002642–0.007926 | 0.005284–0.015852 |
| 4-Bromo-phenylarsonic acid | 0.000660–0.010568 | 0.001320–0.021136 |
| 3-5-Dibromo-phenylarsonic acid | 0.000660–0.010568 | 0.001320–0.021136 |
| 4-Iodo-phenylarsonic acid | 0.000660–0.005284 | 0.001320–0.010568 |
| 3-5-Di-iodo-phenylarsonic acid | 0.001321–0.007926 | 0.002642–0.015852 |
| 4-Fluoro-phenylarsonic acid | 0.001321–0.013210 | 0.001657–0.019853 |
| 4-Iodo-3-5-Dichloro-phenylarsonic acid | 0.000660–0.005287 | 0.001320–0.010574 |
| Sodium-4-Chloro-phenylarsonate | 0.001321–0.013210 | 0.005511–0.033068 |
| Sodium-4-Bromo-phenylarsonate | 0.002642–0.015852 | 0.002204–0.027557 |
| Potassium-3-5-Dibromo-phenylarsonate | 0.000660–0.011687 | 0.001320–0.023374 |
| Ammonium-4-Fluoro-phenylarsonate | 0.001321–0.013210 | 0.001894–0.003783 |
| Sodium-4-Iodo-phenylarsonate | 0.000660–0.005638 | 0.001320–0.011275 |

It will be understood that the optimum concentration ranges indicated for the respective compounds are subject to variations in view of various factors such as those previously noted hereinabove. Moreover the concentration utilized may comprise a preferred value within the range indicated. Illustrative of preferred limits or values of concentrations within the optimum range for various of the compounds listed in Table A, with drinking water as the vehicle, are the following:

|  | Per cent |
|---|---|
| 2-chloro phenylarsonic acid | 0.005284–0.002642 |
| 3-chloro phenylarsonic acid | 0.005284–0.002642 |
| 4-chloro phenylarsonic acid | 0.007926–0.005284 |
| Sod. 4-chlorophenylarsonate | 0.010568–0.007926 |
| 3-5 dichlorophenylarsonic acid | 0.002642 Approx. dose |
| 4-bromophenylarsonic acid | 0.009247–0.003963 |
| Sod. 4-bromophenylarsonate | 0.013210–0.006605 |
| 3-5 dibromo phenylarsonic acid | 0.002642 |
| 4-iodophenylarsonic acid | 0.002642 |
| 3-5 di-iodophenylarsonic acid | 0.005284 |
| 4-fluorophenylarsonic acid | 0.005284 |

The optimum concentration values indicated above are predicated on a large number of tests applicable to poultry, primarily chickens, and represent the conditions wherein essentially no mortality occurred among the infected test birds, substantially no toxicity was attributable to the various designated compounds, and wherein the infected test birds revealed practically complete immunity from hemorrhage symptoms. The tests, however, similarly indicated that effective results are obtainable within a substantially wider range of concentrations wherein manifestations of toxicity and/or hemorrhage among the medicated infected birds are not precluded. But a minor proportion of mortality, generally below 25% of the number of birds infected, is generally recognized as a substantial improvement over the results which apply to a complete lack of medication. Indicative of the latter referred to and wider range of effective concentrations applicable to a number of halogenated phenylarsonates listed in Table A, and embracing the aforementioned optimum values, are the concentration ranges shown in the table hereunder.

TABLE B

Illustrative effective range of water soluble halogenated phenylarsonate compounds in drinking water

| Compound | Maximum Concentration, Per Cent | Minimum Concentration, Per Cent |
|---|---|---|
| 2-Chloro Phenylarsonic acid | 0.010568 | 0.001321 |
| 3-Chloro Phenylarsonic acid | 0.013210 | 0.001321 |
| 4-Chloro Phenylarsonic acid | 0.015852 | 0.003963 |
| Sod. 4-Chlorophenylarsonate | 0.026420 | 0.000660 |
| 3-5 Dichlorophenylarsonic acid | 0.010568 | 0.001321 |
| 4-Bromophenylarsonic acid | 0.01321 | 0.000264 |
| Sod. 4-Bromophenylarsonate | 0.026420 | 0.001321 |
| 3-5 Dibromo Phenylarsonic acid | 0.010568 | 0.000264 |
| 4 Iodophenylarsonic acid | 0.007926 | 0.002642 |
| 3-5 Di-iodophenylarsonic acid | 0.021136 | 0.000660 |

Thus the appropriate concentration range generally applicable to the effective therapeutic treatment of coccidiosis in poultry by halogenated phenylarsonic acid compounds comprises about 0.0003% as the lower value and somewhat below 0.03% or approximately 0.027% for the upper limit. The optimal concentration range comprises approximately 0.0006% to about 0.015% for aqueous solutions, and 0.001% to 0.035% where a solid or mash feed is the vehicle.

The foregoing results, as previously stated, are predicated on an extensive number of tests under comparable conditions for determining the effective concentrations applicable to the given conditions. Thus birds of the same age and breed were divided into equal size groups, usually four chicks to the group. In all cases, infected-unmedicated groups were maintained under conditions similar to that of the treated groups. An additional control group was also resorted to, comprising uninfected and unmedicated birds which served as a standard of comparison. Records were maintained throughout the tests relative to weight, feed and water consumption, mortality and other manifestations of toxicity and hemorrhage as evidenced by the amount of blood passed in the droppings, and other symptoms of coccidiosis. Each medicated chick, as well as those of the infected-unmedicated groups, received approximately 100,000 sporulated cocysts of *Eimeria tenella* on the third day after medication was started. The time interval embraced by the tests generally consumed eleven days.

On the basis of these data, illustrated by Table C hereinbelow, it could be ascertained that the halogenated arsonic compounds develop no adverse effect with respect to normal water consumption when given at optimal concentration ranges for the prevention and control of coccidiosis.

TABLE C

Water consumption by chicks receiving halogenated phenylarsonic acids

| Compounds | Concentration in Drinking Water | Water Consumption per Bird | |
|---|---|---|---|
| | | Treated-Infected | Untreated-Uninfected |
| | Percent | cc. | cc. |
| 2-Chlorophenylarsonic Acid | 0.002642 | 1,501 | 1,414 |
| 3-Chlorophenylarsonic Acid | 0.002642 | 1,595 | 1,605 |
| 4-Chlorophenylarsonic Acid | 0.002642 | 1,778 | 1,683 |
| Sod. 4-Chlorophenylarsonate | 0.007926 | 2,095 | 1,709 |
| 4-Bromophenylarsonic Acid | 0.009247 | 1,880 | 1,691 |
| 3-5 Di-bromophenylarsonic Acid | 0.002642 | 1,698 | 1,543 |
| 4-Iodophenylarsonic Acid | 0.002642 | 2,175 | 1,780 |
| 3-5 Di-iodophenylarsonic Acid | 0.005284 | 1,709 | 1,441 |
| 4-Fluorophenylarsonic Acid | 0.005284 | 1,693 | 1,313 |

For instance, the chlorinated phenylarsonic acids for which the optimal concentration in drinking water is approximately 0.002642% showed, within permissible variations, equal water consumption for treated infected and untreated-uninfected birds. In some instances, such as 3-5-di-iodophenylarsonic acid and 4-iodophenylarsonic acid, water consumption was even 18 to 22% higher for the treated and infected birds, while in no case a substantial lowering of the water consumption was observed within any of the test groups. These comparative imbibition tests bear out the fact that the compounds contemplated within the scope of this invention are free from any repulsive taste to the poultry and do not otherwise entail any degree of adipsy which would gravely impair the health and life of the bird.

While the preferred adaptations of the invention indicated by the various tables are applicable to chickens, it will be understood that the medicaments are similarly pertinent to coccidiosis in other poultry including turkeys and the like. For example, effective results have been attained in the treatment of turkeys infected with *Eimeria meleagridis*, with a halogenated phenylarsonate compound such as sodium 4-chlorophenylarsonate. Similarly the medicaments of the present invention are generally applicable to the other forms of protozoa indicated hereinabove, which pertain to poultry coccidiosis.

The therapeutic substances within the purview of the present invention may be administered, in the form of a single compound, combined with an appropriate vehicle or medium which may be an inert carrier or may provide a supplementary or coordinated physioligical function. Thus, as previously stated, the arsonic compound may be admixed with poultry feed of any type or may be dissolved in an aqueous solution; similarly it may be dispersed in any orally ingestible medium, as in the form of a colloidal dispersion. However, there is no intent to be restricted to this type of medicament, since it may be given as a mixture of halogenated phenylarsonates or as a composition containing halogenated phenylarsonates with other phenyl arsonic substances.

Illustrative of compositions which are desirable for field administration are the following:

Example I

| | Per cent |
|---|---|
| Sodium phenolsulphonate | 43.69 |
| Ammonium phenolsulphonate | 43.69 |
| Sodium 4-chlorophenylarsonate | 1.62 |
| Total | 89.00 |
| Dry granules | 89.00 |
| Boric acid | 11.00 |
| Total | 100.00 |

Example II

| | Per cent |
|---|---|
| Sodium phenolsulphonate | 42.58 |
| Ammonium phenolsulphonate | 52.58 |
| 3-nitro 4-hydroxyphenylarsonic acid | 1.14 |
| Sodium 4-chlorophenylarsonate | 1.70 |
| Boric acid | 12.00 |
| Total | 100.00 |

Example III

| | Per cent |
|---|---|
| Sodium phenolsulphonate | 42.86 |
| Ammonium phenolsulphonate | 42.86 |
| Sodium 4-chlorophenylarsonate | 1.14 |
| 3-nitro 4-hydroxyphenylarsonic acid | 1.14 |
| Total | 88.00 |
| Dry granules | 88.00 |
| Boric acid | 12.00 |
| Total | 100.00 |

It will be noted that these compositions may contain a nitrated phenylarsonate compound as well as a halogenated phenylarsonate, both types of substances having been found effective in the prevention and control of poultry coccidiosis. Merely by way of explanation, and without any limiting intent as to the theory or function or therapeutic efficacy of the various phenylarsonic compounds, the phenolsulfonates may aid in the solution of the arsonic acid compounds in addition to providing a filler having antiseptic properties. The boric acid may function as an antiseptic and assist in the preparation of tablets.

For facilitating distribution of the pharmacological substances, they may be packaged in weighed quantities to provide a designated concentration when appropriately dissolved, in a given vehicle, such as water. Thus the dosage may be in the form of a powder or in tablet form, and in the latter condition, it may be desirable to utilize any nontoxic soluble binder adapted to aid in forming the tablet. Where the preparation of a tablet is contemplated, any orally ingestible binder may be resorted to, such as lactose, which may also contribute to the palatability of the composition and to expediting the solution of the tablet.

Pursuant to the disclosure hereinabove, the invention is predicated on the discovery that halogenated phenylarsonate compounds manifest an enhanced therapeutic value in the treatment and prevention of poultry coccidiosis. As a result of the high pharmacological potency displayed by these compounds in the alleviation and control of the disease, effective medication is attainable with dosages which are comparatively low. The significance of this attribute is apparent in view of the reduction in the arsenical content necessary for ingestion and the attendant diminution in the toxic tendency inherently characteristic of this type of substance. Moreover the efficaciousness of these compounds may be attributable to comparatively low inherent toxicity characteristics at the concentrations which are pharmacologically potent with respect to coccidiosis in poultry. Of material significance is the favorable tendency of these compounds to maintain the consumption of feed including solid and liquid substances as well as water.

While the invention has been described in accordance with the preferred embodiments, it is apparent that many variations and modifications may be resorted to without departing from the scope of equivalents within the purview and spirit of the invention as defined in the following claims.

What I claim is:

1. A composition for the control of coccidiosis in poultry comprising the mixture of a non-toxic vehicle adapted for oral ingestion and a halogenated phenylarsonic compound selected from the group consisting of halogenated phenylarsonic acid and its water soluble salts in the approximate concentration range of 0.00066% to .033%.

2. A composition for the control of coccidiosis in poultry comprising a drinking solution and a halogenated phenylarsonic compound selected from the group consisting of halogenated phenylarsonic acid and its water soluble salts in the approximate concentration range of 0.00066% to 0.016%.

3. A composition for the control of coccidiosis in poultry comprising a poultry feed and a halogenated phenylarsonic compound selected from the group consisting of halogenated phenylarsonic acid and its water soluble salts in the approximate concentration range of 0.001% to 0.033%.

4. A composition for the therapeutic treatment of cecal coccidiosis in poultry comprising the mixture of a non-toxic, orally ingestible vehicle and an alkali metal halogenated phenyl arsonate in the approximate concentration range of 0.0006% to 0.033%.

5. A composition for the therapeutic treatment of cecal coccidiosis in poultry comprising poultry feed containing an alkali metal halogenated phenyl arsonate.

6. A composition for the therapeutic treatment of cecal coccidiosis in poultry comprising the mixture of a non-toxic, orally ingestible vehicle and 4-chloro-phenyl-arsonic acid in the approximate concentration range of 0.004% to 0.022%.

7. A composition for the therapeutic treatment of cecal coccidiosis in poultry comprising an aqueous solution containing 4-chloro-phenylarsonic acid in the approximate concentration range of 0.002% to 0.01%.

8. A composition for the therapeutic treatment of cecal coccidiosis in poultry comprising a non-toxic, orally ingestible vehicle containing sodium-4-chloro-phenylarsonate in the approximate concentration range of .001% to 0.033%.

9. A composition for the therapeutic treatment of cecal coccidiosis in poultry comprising poultry feed containing sodium-4-chloro-phenylarsonate.

10. A composition for the therapeutic treatment of cecal coccidiosis in poultry comprising poultry feed containing sodium-4-chloro-phenylarsonate in the approximate concentration range of 0.006% to 0.033%.

11. A composition for the therapeutic treatment of cecal coccidiosis in poultry comprising an aqueous solution containing sodium-4-chlorophenylarsonate in the approximate concentration range of 0.0013% to 0.013%.

12. A composition for the therapeutic treatment of cecal coccidiosis in poultry comprising an aqueous solution containing an alkali metal halogenated phenylarsonate in the approximate concentration range of 0.0013 to 0.033 per cent.

NEAL F. MOREHOUSE.

REFERENCES CITED

The following references are of record in the file of this patent:

UNITED STATES PATENTS

| Number | Name | Date |
| --- | --- | --- |
| 2,279,421 | Tisdale | Apr. 14, 1941 |

OTHER REFERENCES

Breyer, Biochem. Z., vol. 301, pages 65, 85–93 (1939).

Advancing Fronts in Chemistry, vol. 2, Chemotherapy (1946), page 78. (Copy in Division 43.)